(12) United States Patent
Vanier et al.

(10) Patent No.: US 8,026,299 B2
(45) Date of Patent: Sep. 27, 2011

(54) USE OF NANOPARTICULATE ORGANIC PIGMENTS IN PAINTS AND COATINGS

(75) Inventors: Noel R. Vanier, Wexford, PA (US);
Calum H. Munro, Wexford, PA (US);
Eldon L. Decker, Gibsonia, PA (US);
Rachel B. Wilson, Allison Park, PA (US); Matthew E. Wehrle, Apollo, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 32 days.

(21) Appl. No.: 12/548,956

(22) Filed: Sep. 19, 2009

(65) Prior Publication Data

US 2010/0063195 A1    Mar. 11, 2010

Related U.S. Application Data

(60) Continuation of application No. 11/046,919, filed on Jan. 31, 2005, now Pat. No. 7,727,625, which is a division of application No. 10/165,056, filed on Jun. 7, 2002, now Pat. No. 6,875,800.

(60) Provisional application No. 60/299,038, filed on Jun. 18, 2001.

(51) Int. Cl.
*C09K 9/10* (2006.01)

(52) U.S. Cl. ........ 523/210; 524/449; 524/430; 524/431; 524/497; 106/415; 523/218

(58) Field of Classification Search .................. 523/210, 523/218; 106/415; 524/449, 430, 431, 497
See application file for complete search history.

(56) References Cited

U.S. PATENT DOCUMENTS 6,875,800 B2 *   4/2005   Vanier et al. .................. 523/210
7,727,625 B2 *   6/2010   Vanier et al. .................. 428/323

* cited by examiner

*Primary Examiner* — Robert D. Harlan
(74) *Attorney, Agent, or Firm* — Donald R. Palladino (57) ABSTRACT

A protective and decorative coating composition including about 2 to 10 different colorants which in combination with a resinous composition produce a desired visible coating. A majority of the colorants has a maximum haze of about 10% and exhibits an absorbance peak in the visible spectrum wherein at least about 50% of the total absorbance in the visible spectrum occurs at wavelengths within about 50 nm of the wavelength of the peak absorbance.

16 Claims, 4 Drawing Sheets

USE OF NANOPARTICULATE ORGANIC PIGMENTS IN PAINTS AND COATINGS

CROSS-REFERENCE TO RELATED APPLICATION

This application is a continuation of U.S. patent application Ser. No. 11/046,919 filed Jan. 31, 2005, which is a division of U.S. patent application Ser. No. 10/165,056 filed Jun. 7, 2002, which claims priority to U.S. Provisional Application Ser. No. 60/299,038, filed Jun. 18, 2001.

BACKGROUND OF THE INVENTION

Field of the Invention

The present invention relates to coating compositions containing nanosized colorants, more particularly to coating compositions containing a plurality of nanosized colorants having low haze (high transparency) and a narrow absorbance bandwidth in the visible spectrum.

Paint compositions typically include colorant particles dispersed in a resinous binder. The paint composition may further include reflective pigments such as aluminum flake or mica or other effect pigment compositions or substrate-hiding materials such as titanium dioxide or zinc oxide or lead oxide. The colorant particles used in conventional paints are typically on the order of 0.5 micron in size. Particles of this size absorb light at certain wavelengths and scatter light at other wavelengths. This partial absorption and partial scattering creates a degraded coloration effect when viewed by an observer. Selection of a particular color for a paint requires blending of such colorants and is difficult to achieve using conventional colorants because the colorants have spectral characteristics that overlap one another and because the degrading scattering effects are compounded. As a result, conventional paint compositions typically require blending mixtures selected from of tens or even hundreds of various colorants in order to achieve a desired paint color. To create a paint color on demand, paint suppliers maintain numerous colorants on hand to be able to blend any combination of colorants.

When a new color of a paint composition is desired, several colorants are mixed together and balanced in order to achieve the desired color. This process of producing a colored paint is significantly complicated when the end product is intended to match an existing paint composition. For example, in automotive refinish paints, it is desirable to produce a paint composition that closely matches the paint on an automobile. The color of a paint formulation originally painted on the vehicle during production may change over time and with weathering. In addition, the spectral characteristics of the colorants of the original paint formulation may not be the same as the spectral characteristics of later available colorants. Due to these variabilities, the process of preparing a paint composition that closely matches that of an existing automobile is complicated and often requires trial and error until the desired color is achieved.

Accordingly, a need remains for a method of preparing a protective and decorative coating for applying to a substrate and having a color which is either prespecified or matches a preselected coating composition selected from a minimum quantity of colorants.

SUMMARY OF THE INVENTION

The present invention includes paint compositions containing nanosized colorant particles for producing a desired absorbance in the visible light spectrum. The paint compositions include a plurality of colorants, selected from a set of at least 3 colorants, which in combination with a base coating produces a desired color. Preferably, the set of colorants includes about 3 to about 10 colorants. A majority and preferably each of the colorants has a maximum haze of about 10% and a peak absorbance within the visible spectrum wherein about 50% of the total absorbance in the visible spectrum occurs at wavelengths within about 50 nanometers (nm) of the peak absorbance. In a set of at least three colorants, a first colorant has a maximum absorbance peak in the range of about 400 to about 500 nm, a second colorant has a maximum absorbance peak in the range of about 500 to about 600 nm, and a third colorant has a maximum absorbance peak in the range of about 600 to about 700 nm. By selecting these colorants in varying amounts, a wide color gamut in the visible spectrum can be produced. Additional colorants may be needed to produce paint compositions displaying minimal metamerism. Therefore, it is preferable to include additional colorants also having narrow absorbance peaks in the visible spectrum and having a maximum haze of about 10%.

The colorants are preferably pigments or dyes, more preferably, organic pigments having a primary particle size of less than about 150 nm preferably less than about 70 nm, more preferably less than about 30 nm. The pigments may be produced according to conventional pigment production methods and preferably are produced by milling stock organic pigments with grinding media having a particle size of less than about 0.5 mm, preferably less than 0.3 mm, and more preferably less than about 0.1 mm. The coating compositions may further include substrate-hiding materials. The substrate-hiding materials may include graphite, aluminum, mica, or titanium dioxide.

The present invention further includes a substrate-hiding material in the form of a flake-like assemblage. The flake-like assemblage includes scattering members encapsulated in a resinous polymer. The refractive index of the scattering members and the refractive index of the polymer differ by greater than about 0.1 and the assemblage has an aspect ratio of about 2 to about 250, preferably greater than 5, more preferably greater than 10. The scattering members may be titanium dioxide, zinc oxide, lead oxide, or air voids.

DESCRIPTION OF THE PREFERRED EMBODIMENTS

For purposes of the description hereinafter, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention includes a paint composition containing a plurality of colorants selected from a set of colorants which, when in combination with a resinous binder, produce a desired visible color. A majority and preferably each colorant has a maximum haze and a narrow absorbance peak in the visible spectrum. As used herein, the visible spectrum includes wavelengths of about 400 nm to about 700 nm. The coating composition of the present invention preferably includes the colorants, a resinous binder, and substrate-hiding materials that are described in turn hereinafter. By a "majority" is meant that greater than 50% of the number of colorants have the maximum haze and narrow absorbance peaks. However, a "majority" is also meant to include the situation of greater than 50% by weight of the colorants based on total weight of the colorants has the maximum haze and narrow absorbance peaks.

Colorants

The colorants of the present invention are preferably pigments or dyes, more preferably pigments, having a primary particle size of less than about 150 nm, preferably less than about 70 nm, more preferably less than about 30 nm. Preferably, the primary particles are non-agglomerated. The dispersed particle size is the size of the individual particles (primary particles) or agglomerates of primary particles. The coating composition requires the use of at least two colorants from a set of at least three colorants. The set of colorants includes a first colorant having a maximum absorbance peak in the range of about 400 to about 500 nm, a second colorant having a maximum absorbance peak in the range of about 500 to about 600 nm, and a third colorant having a maximum absorbance peak in the range of about 600 to about 700 nm. A desired color of a paint composition can be produced using various combinations of colorants from the set of colorants in addition to the optional use of a white colorant and a black colorant. The set preferably includes about 3 to about 10 colorants. Hence, the total number of potential colorants selectable for use in a paint composition is about 12.

Figure 1:
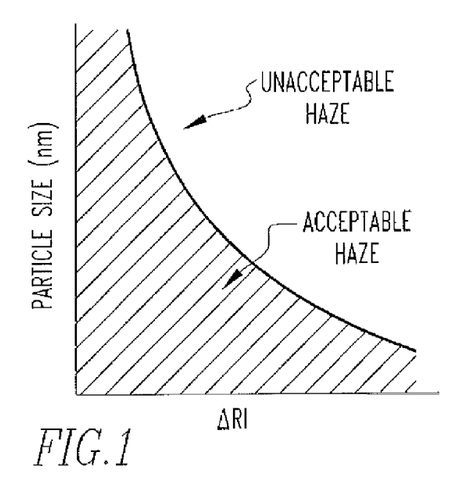
FIG. 1 is a graph of particle size versus difference in refractive index for colorant particles suspended in a resinous binder.

A majority and preferably each of the colorants has a maximum haze of about 10%, preferably a maximum haze of about 1%. Haze is a measurement of the transparency of a material and is defined by ASTM D1003. The haze values described herein are determined with a Byk-Gardner TCS (The Color Sphere) instrument having a 500 micron cell path length on colorants dispersed in butyl acetate. Because the % haze of a liquid sample is concentration dependent, we specify herein the % haze at a transmittance of about 15% to about 20% at the wavelength of maximum absorbance. As generally shown in FIG. 1, an acceptable haze may be achieved for relatively large particles when the difference in refractive index between the particles and the surrounding medium is low. Conversely, for smaller particles, greater refractive index differences between the particle and the surrounding medium may provide an acceptable haze.

In addition, the colorants of the present invention exhibit a relatively narrow band of peak absorbance in the visible spectrum wherein at least about 50% or at least about 60% of the total absorbance in the visible spectrum occurs at wavelengths within about 50 nm of the wavelength of peak absorbance. In a preferred embodiment, the first colorant has at least about 70% (more preferably at least about 80%) of its total absorbance in the visible spectrum in the range of about 400 to about 500 nm, the second colorant has at least about 70% (more preferably at least about 75%) of its total absorbance in the visible spectrum in the range of about 500 to about 600 nm and the third colorant has at least about 60% (more preferably at least about 70%) of its total absorbance in the visible spectrum in the range of about 600 to about 700 nm. The combined features of low haze and narrow maximum absorbance peak in the visible spectrum of the colorants of the present invention create a defined color effect. Accordingly, a relatively small number of different colorants (2 to 12) may be used in combination to produce a desired color in a paint composition. At least two colorants are needed to produce a paint composition having a desired color. Due to the nature of human color vision, two colored articles may be appear the same color under illumination with a given light source, even though they may have differences in their reflection spectra. Because of the differences in their reflection spectra, these same two articles may appear to be different from each other in color under a different light source. This illuminant-dependent color matching phenomenon, referred to as metamerism, may be undesirable particularly for automotive refinish paint compositions that appear to match an original automotive paint when indoors but fail to match outdoors. By selecting more than two of the colorants of the present invention, metamerism can be avoided since the visible spectra of the colorants can be combined to closely match the spectrum of a desired color due to the absence of scattering degradation with these colorants and their spectral selectivity.

In certain coating compositions containing metallic pigments, it may be desirable to include colorants which do not have the properties of the maximum haze and narrow absorbance peak. For example, conventional metallic paint which appears cyan when viewed directly (on face) from reflected light appears red when viewed at an angle (flop) from scattered light. The colorants of the present invention have minimal scatter. Hence, a coating composition containing only the colorants of the present invention may appear black on flop. In order to create a color effect mimicking conventional paint, additional colorants may be added to the coating composition so that on flop, the coating appears a desired color other than black. Accordingly, the inclusion of conventional colorants in a coating composition along with the colorants of the present invention having the low haze and narrow peak absorbance band is optional.

Suitable pigment compositions that may be used in the present invention to produce the colorants include azo (monoazo, disazo, -naphthol, naphthol AS, salt type (lakes), benzimidazolone, condensation, metal complex, isoindolinone, isoindoline) and polycyclic (phthalocyanine, quinacridone, perylene, perinone, diketopyrrolo pyrrole, thioindigo, anthraquinone (indanthrone, anthrapyrimidine, flavanthrone, pyranthrone, anthanthrone, dioxazine, triarylcarbonium, quinophthalone) pigments, and mixtures thereof. In order to achieve the desired haze (minimal scattering) of no more than about 10% haze, the colorants have a particle size of about 150 nm or less, preferably less than about 70 nm and, more preferably, less than about 30 nm. Preferably, the particles are non-agglomerated.

Particles of the colorant may be prepared by milling bulk colorants, e.g., organic pigments, with milling media having a particle size of less than about 0.5 mm, preferably less than 0.3 mm and more preferably about 0.1 mm or smaller. The pigment particles are milled to nanoparticulate sizes in a high energy mill in an organic solvent system, such as butyl acetate using a dispersant, such as Solsperse® 32,500 available from Avecia, Inc. of Wilmington, Del. or in water using a dispersant, such as Solsperse® 27,000 available from Avecia, Inc. with an optional polymeric grinding resin. Other suitable methods of producing the colorants of the present invention include crystallization, precipitation, gas phase condensation, and chemical attrition (i.e., partial dissolution).

Resinous Binder

The decorative and protective coating composition of the present invention includes a resinous binder. Conventional resinous binders may be used with the colorants described herein in automotive OEM compositions, automotive refinish compositions, industrial coatings, architectural coatings, electrocoatings, powder coatings, coil coatings, and aerospace coatings.

Suitable resinous binders include a curable coating composition including components such as hydroxyl or carboxylic acid-containing acrylic copolymers and hydroxyl or carboxylic acid-containing polyester polymers and oligomers and isocyanate or hydroxyl-containing polyurethane polymers, or amine or isocyanate-containing polyureas which can enhance cure rate, appearance and other physical properties of the cured coating.

The acrylic polymers, if used, are typically copolymers of acrylic acid or methacrylic acid or hydroxyalkyl esters of acrylic or methacrylic acid such as hydroxyethyl methacrylate or hydroxypropyl acrylate with one or more other polymerizable ethylenically unsaturated monomers such as alkyl esters of acrylic acid including methyl methacrylate and 2-ethyl hexyl acrylate, and vinyl aromatic compounds such as styrene, alpha-methyl styrene and vinyl toluene. The ratio of reactants and reaction conditions are selected to result in an acrylic polymer with pendant hydroxyl or carboxylic acid functionality.

Besides acrylic polymers, the curable coating composition of the present invention can contain a polyester polymer or oligomer. Such polymers may be prepared in a known manner by condensation of polyhydric alcohols and polycarboxylic acids. Suitable polyhydric alcohols include ethylene glycol, neopentyl glycol, trimethylol propane and pentaerythritol.

Suitable polycarboxylic acids include adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters may be used. Also, small amounts of monocarboxylic acids such as stearic acid may be used.

Hydroxyl-containing polyester oligomers can be prepared by reacting an anhydride of a dicarboxylic acid such as hexahydrophthalic anhydride with a diol such as neopentyl glycol in a 1:2 molar ratio.

Where it is desired to enhance air-drying, suitable drying oil fatty acids may be used and include those derived from linseed oil, soya bean oil, tall oil, dehydrated castor oil or tung oil.

The polyesters are made to contain free terminal hydroxyl and/or carboxyl groups that are available for further crosslinking reactions.

Polyurethane polymers containing terminal isocyanate or hydroxyl groups may also be used. The polyurethane polyols or NCO-terminated polyurethanes that can be used are those prepared by reacting polyols including polymeric polyols with polyisocyanates. The polyurea-containing terminal isocyanate or primary or secondary amine groups which can be used are those prepared by reacting polyamines including polymeric polyamines with polyisocyanates. The hydroxyl/isocyanate or amine/isocyanate equivalent ratio is adjusted and reaction conditions selected to obtain the desired terminal group. Examples of suitable polyisocyanates are those described in U.S. Pat. No. 4,046,729 at column 5, line 26 to column 6, line 28, hereby incorporated by reference. Examples of suitable polyols are those described in U.S. Pat. No. 4,046,729 at column 7, line 52 to column 10, line 35, hereby incorporated by reference. Examples of suitable polyamines are those described in U.S. Pat. No. 4,046,729 at column 6, line 61 to column 7, line 32 and in U.S. Pat. No. 3,799,854 at column 3, lines 13 to 50, both hereby incorporated by reference.

Suitable curing agents for the curable coating composition include aminoplast resins and phenoplast resins and mixtures thereof, as curing agents for OH and COON, and amide and carbamate functional group containing materials. Examples of aminoplast and phenoplast resins suitable as curing agents in the curable compositions of the present invention are those described in U.S. Pat. No. 3,919,351 at col. 5, line 22 to col. 6, line 25, hereby incorporated by reference.

Polyisocyanates and blocked polyisocyanates as curing agents for OH and primary and/or secondary amino group containing materials are well known in the art. Examples of polyisocyanates and blocked isocyanates suitable for use as curing agents in the curable compositions of the present invention are those described in U.S. Pat. No. 4,546,045 at col. 5, lines 16 to 38; and in U.S. Pat. No. 5,468,802 at col. 3, lines 48 to 60, both hereby incorporated by reference.

Anhydrides as curing agents for OH and primary and/or secondary amino group containing materials are well known in the art. Examples of anhydrides suitable for use as curing agents in the curable compositions of the present invention are those described in U.S. Pat. No. 4,798,746 at col. 10, lines 16 to 50; and in U.S. Pat. No. 4,732,790 at col. 3, lines 41 to 57, both hereby incorporated by reference.

Polyepoxides as curing agents for COON functional group containing materials are well known in the art. Examples of polyepoxides suitable for use as curing agents in the curable compositions of the present invention are those described in U.S. Pat. No. 4,681,811 at col. 5, lines 33 to 58, hereby incorporated by reference.

Polyacids as curing agents for epoxy functional group containing materials are well known in the art. Examples of polyacids suitable for use as curing agents in the curable compositions of the present invention are those described in U.S. Pat. No. 4,681,811 at col. 6, line 45 to col. 9, line 54, hereby incorporated by reference.

Polyols, that is, material having an average of two or more hydroxyl groups per molecule, can be used as curing agents for NCO functional group containing materials and anhydrides and esters and are well known in the art. Examples of said polyols are those described in U.S. Pat. No. 4,046,729 at col. 7, line 52 to col. 8, line 9; col. 8, line 29 to col. 9, line 66; and in U.S. Pat. No. 3,919,315 at col. 2, line 64 to col. 3, line 33, both hereby incorporated by reference.

Polyamines can also be used as curing agents for NCO functional group containing materials and for carbonates and unhindered esters and are well known in the art. Examples of polyamines suitable for use as curing agents in the curable compositions of the present invention are those described in U.S. Pat. No. 4,046,729 at col. 6, line 61 to col. 7, line 26, hereby incorporated by reference.

The decorative and protective coating composition may be used as a single coating, as a clear top coating composition, as a base coating in a two-layered system, a layers of a multi-layered system including a clear top coating composition, colorant layer and base coating composition, or as a primer layer.

Substrate-hiding Materials

The decorative and protective coating composition of the present invention includes substrate-hiding materials. The hiding materials are preferably in platelet form and include graphite, alumina, mica, or a scattering member. A preferred hiding particle is a polymer encapsulated scattering member.

Figure 2:
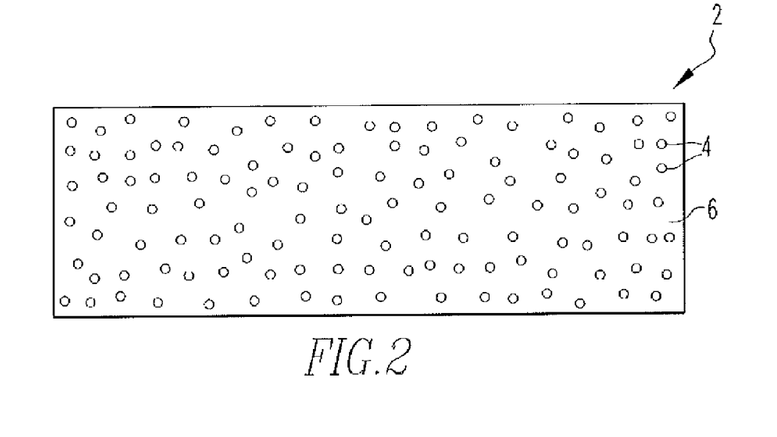
FIG. 2 is a cross section of a substrate-hiding material made in accordance with the present invention.

The polymer encapsulated scattering pigment may be in the form of a flake-like assemblage as shown in FIG. 2. The flake-like assemblage 2 includes scattering members 4 encapsulated in a resinous polymer 6. The scattering members 4 may be titanium dioxide, zinc oxide, lead oxide, or air voids or combinations thereof. A difference in refractive index between the scattering members 4 and the polymer 6 is greater than about 0.1, preferably greater than about 1. The flake-like assemblage 2 has an aspect ratio of about 2 to 250, preferably greater than about 5, more preferably greater than about 10. The volume ratio of the scattering members 4 to the polymer 6 is about 1:10 to about 10:1. When the flake-like assemblages 2 are included in a paint composition and the paint is applied to a substrate, the flake-like assemblages 2 tend to align with the substrate and with each other in parallel along their longest dimensions to create multidirectional scattering of light in the paint composition.

Figure 3:
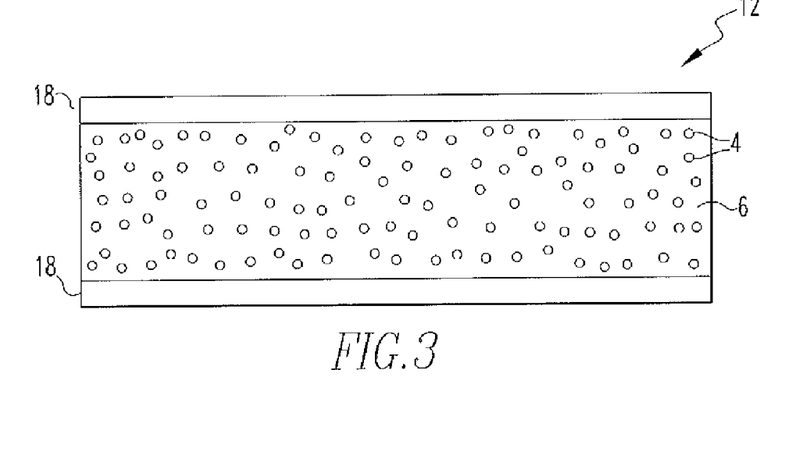
FIG. 3 is a cross section of another embodiment of a substrate-hiding material.

In an alternative embodiment, shown in FIG. 3, a flake-like assemblage 12 includes the scattering members 4 dispersed in resinous polymer 6. A colorant layer 18 is provided on each surface of the polymer 6. The total thickness of the colorant layers 18 preferably is about 2% to about 90% of the thickness of the total flake-like assemblage 12. The colorant layers 18 include colorant particles (not shown) dispersed in a resinous polymer that may be the same or different polymer as the resinous polymer 16. The colorant particles preferably include pigment particles having sizes less than about 150 nm and preferably are the colorants described above. By including the colorant layer 18 adjacent to the scattering members 4, light which reaches the scattering members 4 necessarily has passed through a region containing the colorants of the present invention. This ensures that light scattered from the flake-like assemblage 12 will have been subjected to the light absorbance of the colorant particles.

Figure 4:
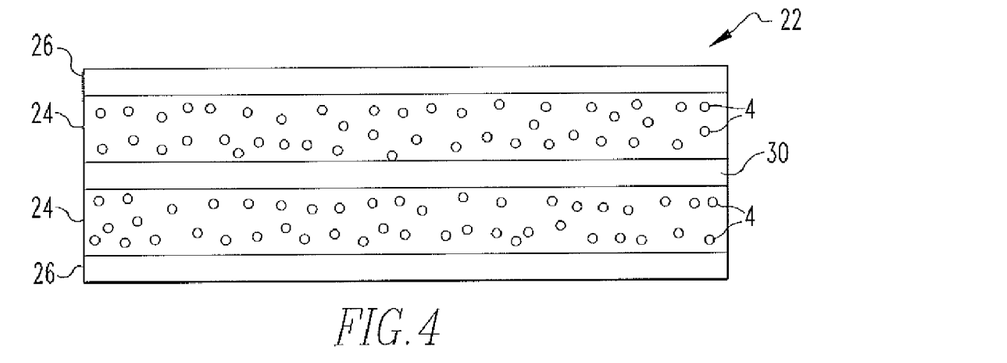
FIG. 4 is a cross section of another embodiment of a substrate-hiding material.
Figure 5:
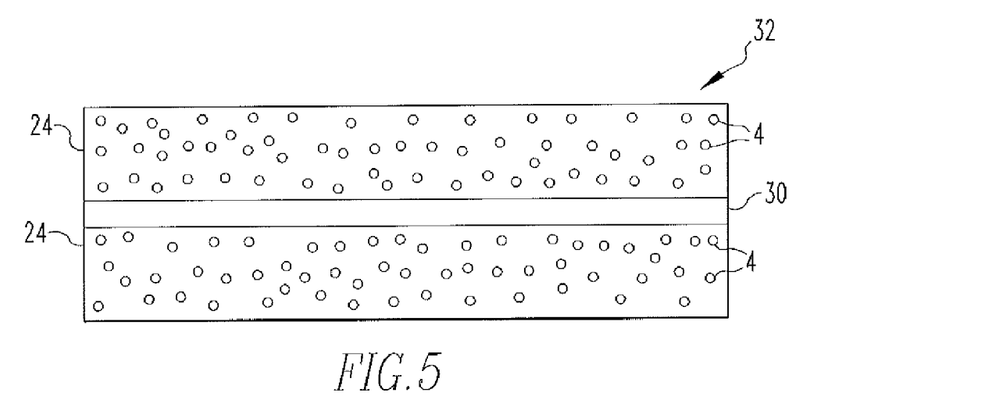
FIG. 5 is a cross section of another embodiment of a substrate-hiding material.

In another embodiment shown in FIG. 4, a flake-like assemblage 22 includes a pair of layers 24 including the scattering members 4 dispersed in the resinous polymer 6. Layers 26 of the colorant particles cover the layers 24. Intermediate to the layers 24 is a layer 30 containing dark pigments (not shown). The dark colored layer 30 absorbs that light which may be forward scattered by the scattering members 4. Alternatively, a flake-like assemblage 32 shown in FIG. 5 may include the layers 24 and 30 without the outer layers 26.

Figure 6:
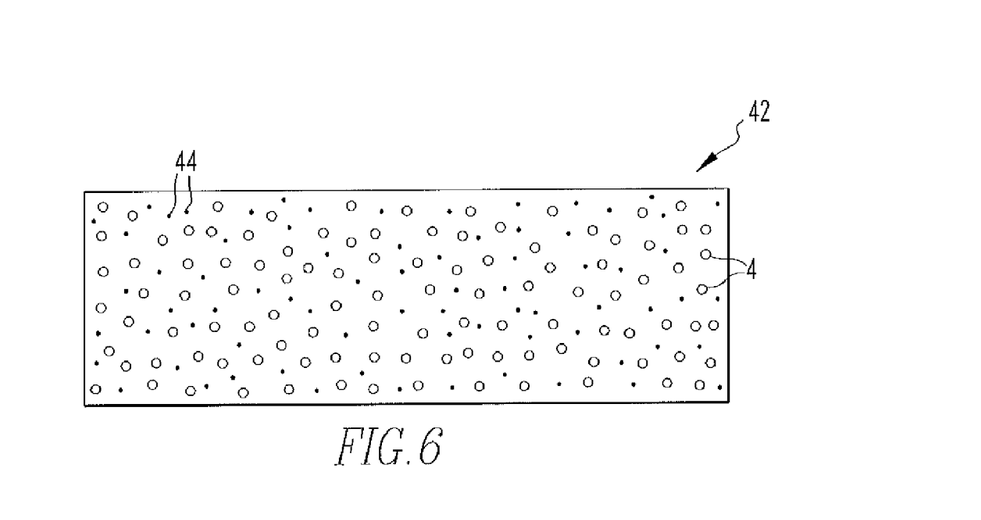
FIG. 6 is a cross section of another embodiment of a substrate-hiding material.

Another embodiment of a flake-like assemblage 42 is shown in FIG. 6 including the scattering members 4 dispersed in the polymer 6. Also dispersed in the polymer 6 are filler materials 44, such as silica, which serve to maintain the scattering members 4 spaced apart from each other. Preferably, the scattering members 4 are sized about 200 to 300 nm and the filler particles 44 are about 150 nm in size. The polymer 6 typically may have a refractive index of about 1.35 to about 1.8 and scattering members of titanium dioxide have a refractive index of about 2.1 to about 2.7. The titanium dioxide scattering members may be coated with a passivating layer of silica or alumina. When the filler particles 44 are silica, which has a refractive index of about 1.46, the filler particles 44 may increase the difference in refractive index between the surrounding composite of resinous binder with silica and the scattering members 4.

Color Matching Methods

The present invention further includes a method of color matching a preselected coating. According to the method of the present invention, the visible color of the preselected coating is determined by measuring the absorbance or reflectance of the preselected coating across the range of wavelengths corresponding to visible light. Preferably, the absorbance or reflectance of the preselected coating is determined using a spectrophotometer and a curve of the absorbance or reflectance across the range of wavelengths corresponding to visible light is produced. This curve is referred to as the visible absorbance or reflectance spectrum. Two or more of the colorants of the present invention are selected which in appropriate concentrations in combination with a resinous binder produce a colored coating composition having a visible absorbance or reflectance spectrum closely matching that of the preselected coating. It is believed that a set of 10 different colorants of the present invention in addition to a black colorant and a white colorant may be used to produce colors of preselected coatings.

The present invention also includes a method of creating a new color of a coating composition. The colorants of the present invention having known spectral characteristics may be combined with a resinous binder to produce a desired color.

The invention will further be described by reference to the following examples.

EXAMPLE 1

Chromothal® Yellow BGN (Ciba Specialty Chemicals, Inc., High Point, N.J.) was milled and dispersed on an Advantis® mill (Draiswerke, Inc., Mahwah, N.J.) using Solsperse® dispersants (Avecia, Inc., Wilmington, Del.) and Zonyl® (polytetrafluoroethylene) (E.I. duPont de Nemours and Company, Wilmington, Del.), Table 1 sets forth the milling components and conditions. For analysis, the final colorant was diluted with n-butyl acetate. Table 2 lists the properties of the final colorant. The average primary particle size was obtained with a Philips CM12 transmission electron microscope (TEM) at 100 kV. The % haze was measured with a Byk-Gardner TCS (The Color Sphere) instrument having a 500 micron cell path length. The visible absorption spectrum of the pigment composition was obtained with a Perkin-Elmer, Lamda 2, UV/vis spectrometer in a cuvette with 1 cm path length and is reproduced in FIG. 7 with the spectrum normalized to 1 at the wavelength of maximum absorbance. The crosshatched region represents the integrated absorbance over those wavelengths within a 100 nm wavelength range centered at the wavelength of maximum absorbance and within the visible range of 400 to 700 nm. With this colorant, 85% of the total absorbance in the visible spectrum occurs between the wavelengths of 400 to 500 nm.

TABLE 1

| % of mill base | Example | | | | | | |
|---|---|---|---|---|---|---|---|
| | 1 | 2 | 3 | 4 | 5 | 6 | 7 |
| Pigment | 8.17 | 13.56 | 13.24 | 9.34 | 5.00 | 9.20 | 4.80 |
| Solsperse ® 5000 | 0 | 0 | 2.07 | 0.89 | 0 | 0 | 0 |
| Solsperse ® 22000 | 0 | 0 | 0 | 0 | 0 | 0.18 | 0.94 |
| Zonyl ® FSO | 0.12 | 0 | 0 | 0 | 0 | 0.00 | 0.00 |
| Solsperse ® 32500 | 0 | 33.88 | 29.94 | 41.12 | 2.59 | 0 | 0 |
| Solsperse ® 31845 | 0 | 0 | 0 | 0 | 0 | 26.18 | 0 |
| Dispersant* | 10.73 | 0 | 0 | 0 | 0 | 0 | 13.83 |
| Acrylic grind polymer** | 30.20 | 0 | 0 | 0 | 33.94 | 17.92 | 49.06 |
| n-butyl acetate | 37.60 | 35.04 | 48.86 | 36.60 | 38.98 | 31.18 | 22.68 |
| Dowanol PM acetate | 13.23 | 17.52 | 5.89 | 12.05 | 19.49 | 15.34 | 8.70 |
| Mill residence time (min.) | 185 | 37 | 55 | 103 | 63 | 443 | 319 |
| Media size (mm) | 0.3 | 0.3 | 0.3 | 0.2 | 0.2 | 0.3 | 0.2 |

*A quaternary ammonium group containing polymer prepared as generally described in U.S. Pat. No. 6,365,666 B, by atom transfer radical polymerization techniques from the following monomers on a weight basis: 4.7% glycidyl methacrylate, 20.3% benzylmethacrylate, 14.1% butylmethacrylate, 52.3% 2-ethyhexylmethacrylate and 7.1% of hydroxypropyl methacrylate. The polymer was quaternized with the lactic acid salt of dimethethanol amine. The polymer has an M(n) of 9505 and an M(w) of 15,445 as determined by gel permeation chromatography using a polystyrene standard.
**An acrylic polymer iminated with propylene imine prepared by solution polymerization techniques from the following monomers on a weight basis: 29.32% styrene, 19.55% 2-ethylhexyl acrylate, 19.04% butyl methacrylate, 9.77% 2-hydroxyethyl acrylate, 1.86% methacrylic acid, and 0.59% acrylic acid.

TABLE 2

| Properties | Example | | | | | | |
|---|---|---|---|---|---|---|---|
| | 1 | 2 | 3 | 4 | 5 | 6 | 7 |
| TEM primary particle size (nm) | 100 | 20 | 30 | 20 | 60 | 90 | 50 |
| % Haze* | 9.18 | 0.17 | 0.13 | 0.33 | 0.71 | 3.03 | 2.25 |
| % IA** | 75 | 70 | 67 | 67 | 59 | 66 | 75 |
| % Total solids (by weight)*** | 31.42 | 30.32 | 38.43 | 24.9 | 41.28 | 32.12 | 37.18 |
| % Pigment (by weight)*** | 8.92 | 7.98 | 9.73 | 8.75 | 4.97 | 8.48 | 5.55 |

*Percent haze at a transmittance of about 17.5% at the wavelength of maximum absorbance.
**Percent of integrated absorbance within the visible range that lies within a 100 nm wavelength range centered at the wavelength of maximum absorbance.
***The colorants were adjusted to attain these final % solids and % pigment values.

EXAMPLE 2

Figure 8:
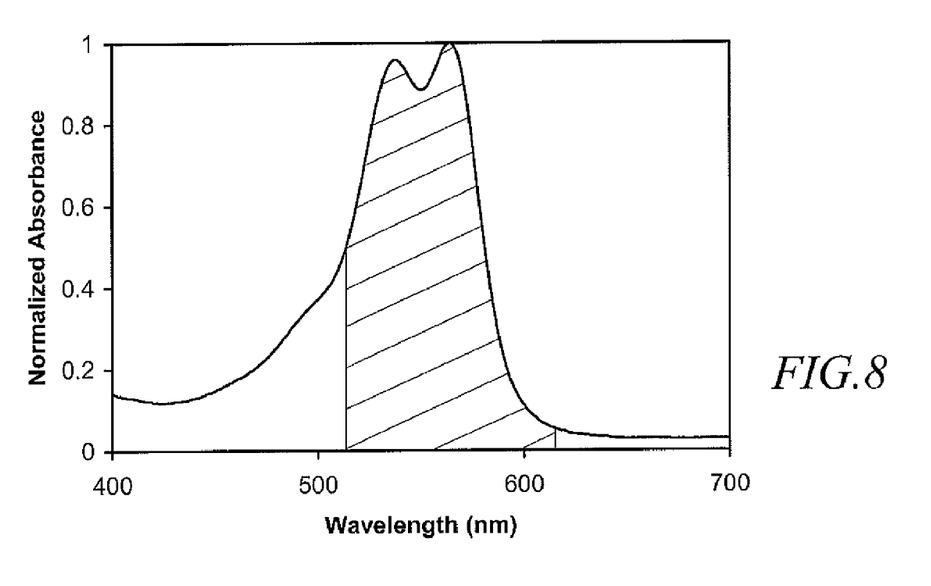
FIG. 8 is a normalized absorbance spectrum for another colorant of the present invention.

A magenta pigment of Hostaperm® Pink EB Trans (Clariant Corporation, Charlotte, N.C.) was milled and dispersed and analyzed as in Example 1. See Tables 1 and 2. In FIG. 8, the visible absorption spectrum is normalized to 1 at the wavelength of maximum absorbance. The crosshatched region represents the integrated absorbance over those wavelengths within a 100 nm wavelength range centered at the wavelength of maximum absorbance and within the visible range of 400 to 700 nm. With this colorant, 75% of the total absorbance in the visible spectrum occurs between the wavelengths of 500 to 600 nm.

EXAMPLE 3

Figure 9:
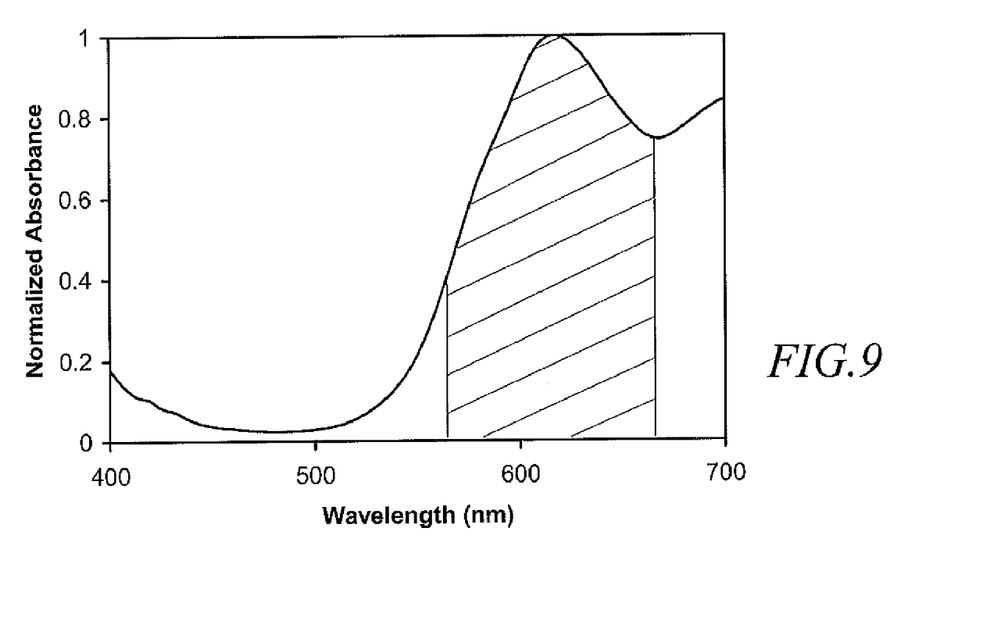
FIG. 9 is a normalized absorbance spectrum for another colorant of the present invention.

A cyan pigment of Heliogen® Blue L 7081D, (BASF Corporation, Mount Oliver, N.J.) was milled and dispersed and then analyzed as in Example 1. In FIG. 9, the spectrum is normalized to 1 at the wavelength of maximum absorbance. The crosshatched region represents the integrated absorbance over those wavelengths within a 100 nm wavelength range centered at the wavelength of maximum absorbance and within the visible range of 400 to 700 nm. With this colorant, 70% of the total absorbance in the visible spectrum occurs between the wavelengths of 600 to 700 nm.

Figure 7:
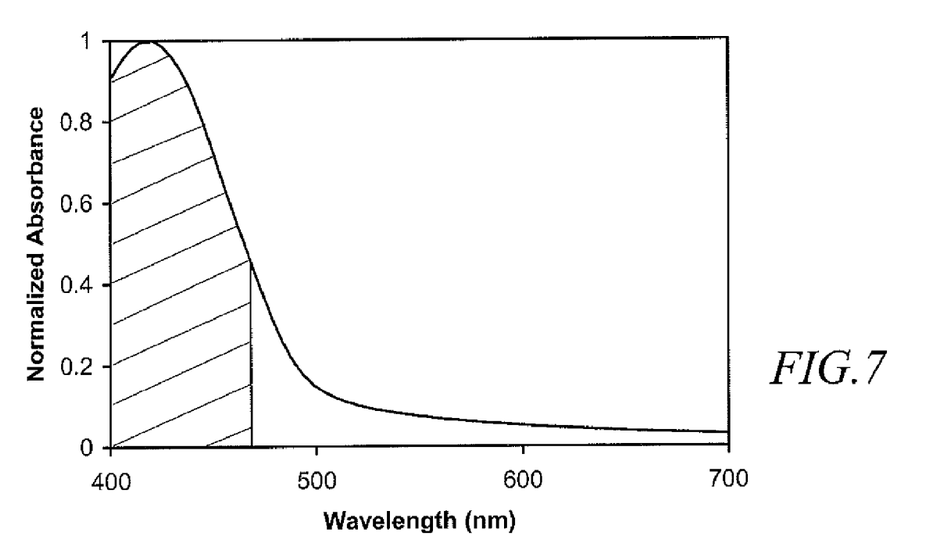
FIG. 7 is a normalized absorbance spectrum for a colorant of the present invention.
Figure 10:
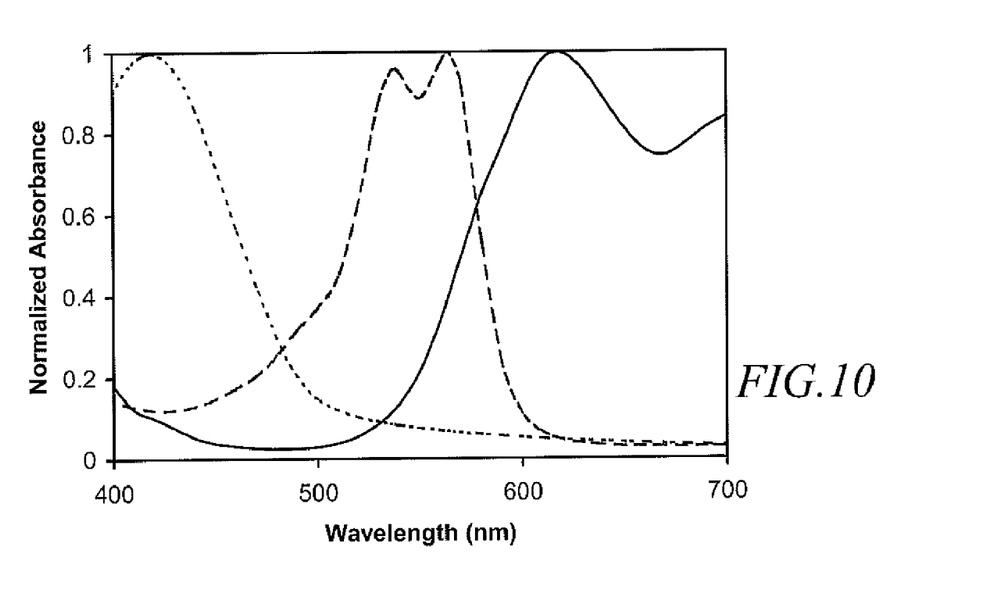
FIG. 10 is a composite spectrum of the spectra of FIGS. 7-9.

FIG. 10 includes the spectra of FIGS. 7-9 without the crosshatched regions. The relatively narrow absorbance peaks of the colorants of Examples 1-3 and minimal overlap therebetween is demonstrated in FIG. 10 (Example 1, dotted line; Example 2, dashed line; Example 3, solid line).

EXAMPLE 4

A green pigment of Monolite Green 860/Monastrol Green 6Y (Avecia) was milled and dispersed and analyzed as in Example 1. See Tables 1 and 2.

EXAMPLE 5

A violet pigment of Monolite Blue 3R (Avecia) was milled and dispersed and analyzed as in Example 1. See Tables 1 and 2.

EXAMPLE 6

A red-orange pigment of 12-4215 Hostaperm® Scarlet GO Trans (Clariant) was milled and dispersed and analyzed as in Example 1. See Tables 1 and 2.

EXAMPLE 7

A yellow-orange pigment of Irgazin® Yellow 3RLTN (Ciba) was milled and dispersed and analyzed as in Example 1. See Tables 1 and 2.

EXAMPLE 8

A metal panel (C1) was coated with a blue paint containing the following PPG Industries, Inc. (Pittsburgh, Pa.) automotive refinish mixing bases (all percentages are weight %): DMD1676 (blue) 65.14%, DMD1684 (white) 15.49%, DMD614 (blue) 6.34%, DMD1683 (black) 3.17%, DBX1689 (clear) 9.86%. The color of this panel was nonmetamerically matched and a corresponding panel (N1) was coated with a paint containing DMD1684 (white) 14.75%, DMD1683 (black) 3.00%, the cyan colorant of Example 3 35.25%, the violet colorant of Example 5 6.00%, and DBX1689 (clear) 41.00%. The CIE color of the panels (under D65 illumination, 10° observer) and the color differences (under three illuminants) are shown in Table 3a and 3b.

TABLE 3a

| Panel | L* | a* | b* | C* | h° |
|---|---|---|---|---|---|
| C1 | 28.39 | −12.01 | −34.86 | 36.87 | 250.99 |
| N1 | 28.25 | −12.12 | −33.85 | 35.95 | 250.29 |

TABLE 3b

| Difference formula | D65-10° | A-10° | CWF-10° |
|---|---|---|---|
| ΔE*ab | 1.03 | 1.36 | 1.31 |
| ΔE*cmc (2:1) | 0.52 | 0.55 | 0.60 |

EXAMPLE 9

A metal panel (C2) was coated with a salmon-peach colored paint containing the following PPG Industries, Inc. automotive refinish mixing bases (all percentages are weight %): DMD616 (orange) 37.64%, DMD1684 (white) 16.00%, DMD1679 (red) 5.96%, DMD666 (yellow) 1.13%, DMD1683 (black) 1.00%, DBX1689 (clear) 38.27%. A good visual match to the color of this panel was produced with a corresponding panel (N2), coated with a paint containing DMD1684 (white) 33.75%, DMD1683 (black) 1.25%, the red-orange colorant of Example 6 27.00%, the yellow colorant of Example 1 5.50%, and DBX1689 (clear) 32.50%. The CIE color of the panels (under D65 illumination, 10° observer) and the color differences (under three illuminants) are shown in Table 4a and 4b below.

TABLE 4a

| Panel | L* | a* | b* | C* | h° |
|---|---|---|---|---|---|
| C2 | 52.74 | 39.67 | 28.21 | 48.68 | 35.42 |
| N2 | 53.05 | 39.94 | 28.26 | 48.93 | 35.28 |

TABLE 4b

| Difference formula | D65-10° | A-10° | CWF-10° |
|---|---|---|---|
| ΔE*ab | 0.42 | 0.73 | 1.10 |
| ΔE*cmc (2:1) | 0.20 | 0.55 | 0.81 |

EXAMPLE 10

A metal panel (C3) was coated with a light-green paint comprised of the following PPG Industries, Inc. automotive refinish mixing bases (all percentages are weight %): DMD1684 (white) 41.07%, DMD1678 (green) 35.71%, DMD648 (black) 8.93%, DMD644 (yellow) 2.50%, DBX1689 (clear) 11.79%. A good visual match to the color of this panel was produced with a corresponding panel (N3) coated with a paint containing DMD1684 (white) 54.02%, the green colorant of Example 4 19.35%, the yellow-orange colorant of Example 7 3.77%, and DBX1689 (clear) 22.86%. The CIE color of the panels (under D65 illumination, 10° observer) and the color differences (under three illuminants) are shown in Tables 5a and 5b below.

TABLE 5a

| Panel | L* | a* | b* | C* | h° |
|---|---|---|---|---|---|
| C3 | 64.40 | −45.54 | 15.71 | 48.18 | 160.97 |
| N3 | 64.38 | −45.22 | 16.16 | 48.02 | 160.34 |

TABLE 5b

| Difference formula | D65-10° | A-10° | CWF-10° |
|---|---|---|---|
| ΔE*ab | 0.55 | 0.99 | 0.65 |
| ΔE*cmc (2:1) | 0.29 | 0.49 | 0.33 |

EXAMPLE 11

A metal panel (C4) was coated with a red (fuchsia) paint comprised of the following PPG Industries, Inc. automotive refinish mixing bases (all percentages are weight %): DMD616 (orange) 32.68%, DMD1605 (magenta) 26.40%, DMD1684 (white) 6.60%, DMD648 (black) 0.99%, DBX1689 (clear) 33.33%. A good visual match to the color of this panel was produced with a corresponding panel (N4), coated with a paint containing DMD1684 (white) 11.25%, the red-orange colorant of Example 6 28.00%, the magenta colorant of Example 2 15.75%, and DBX1689 (clear) 45.00%. The CIE color of the panels (under D65 illumination, 10° observer) and the color differences (under three illuminants) are shown in Tables 6a and 6b below.

TABLE 6a

| Panel | L* | a* | b* | C* | h° |
|---|---|---|---|---|---|
| C4 | 34.45 | 52.15 | 16.27 | 54.63 | 17.33 |
| N4 | 34.81 | 51.94 | 15.79 | 54.29 | 16.91 |

TABLE 6b

| Difference formula | D65-10° | A-10° | CWF-10° |
|---|---|---|---|
| ΔE*ab | 0.64 | 1.72 | 1.65 |
| ΔE*cmc (2:1) | 0.34 | 0.70 | 1.00 |

EXAMPLE 12

A metal panel (C5) was coated with a metallic green paint comprised of the following PPG Industries, Inc. automotive refinish mixing bases (all percentages are weight %): DMD1678 (green) 41.53%, DMD1686 (fine aluminum) 27.68%, DMD1687 (medium course aluminum) 12.11%, DMD644 (yellow) 6.57%, DMD1683 (black) 3.11%, DMD1684 (white) 2.08%, DBX1689 (clear) 6.92%. A good visual match to the color of this panel was produced with a corresponding panel (N5) coated with a paint containing DMD633 (medium aluminum) 27.50%, DMD1684 (white) 2.50%, DMD1683 (black) 2.50%, the green colorant of Example 4 15.00%, the yellow-orange colorant of Example 7 5.00%, and DBX1689 (clear) 47.50%. The CIE color of the panels (under D65 illumination, 10° observer) and the color differences (under three illuminants) are shown in Tables 7a and 7b below.

TABLE 7a

| Panel | L* | a* | b* | C* | h° |
|---|---|---|---|---|---|
| C5 | 47.13 | −26.81 | 14.09 | 30.29 | 152.27 |
| N5 | 46.82 | −25.70 | 13.89 | 29.21 | 151.60 |

TABLE 7b

| Difference formula | D65-10° | A-10° | CWF-10° |
|---|---|---|---|
| ΔE*ab | 1.17 | 0.48 | 0.57 |
| ΔE*cmc (2:1) | 0.61 | 0.32 | 0.32 |

EXAMPLE 13

A metal panel (C6) was coated with a green paint comprised of the following PPG Industries, Inc. automotive refinish mixing bases (all percentages are weight %): DMD1678 (green) 74.21%, DMD1676 (blue) 19.35%, DMD1684 (white) 6.34%, DMD1683 (black) 0.10%. A good visual match to the color of this panel was produced with a corresponding panel (N6) coated with a paint containing DMD1684 (white) 5.75%, DMD1683 (black) 1.00%, the green colorant of Example 4 34.00%, the yellow colorant of Example 1 3.25%, the cyan colorant of Example 3 9.00%, and DBX1689 (clear) 47.00%. The CIE color of the panels (under D65 illumination, 10° observer) and the color differences (under three illuminants) are shown in Tables 8a and 8b below.

TABLE 8a

| Panel | L* | a* | b* | C* | h° |
|---|---|---|---|---|---|
| C6 | 26.67 | −44.03 | 0.81 | 44.04 | 178.95 |
| N6 | 27.38 | −45.16 | 0.85 | 45.17 | 178.92 |

TABLE 8b

| Difference formula | D65-10° | A-10° | CWF-10° |
|---|---|---|---|
| ΔE*ab | 1.33 | 2.07 | 1.68 |
| ΔE*cmc (2:1) | 0.66 | 0.94 | 0.94 |

EXAMPLE 14

A composition comprising a dispersion of titanium dioxide in acrylic monomers was prepared via the following procedure. 780 g Ti-Pure R-706 titanium dioxide pigment (Du Pont) and 6 g cellulose acetate butyrate from Sigma-Aldrich Company, Milwaukee, Wis., were dispersed using a rotary stirrer, fitted with a 2.5 inch diameter cowles blade, at 1100 revolutions per minute, in 160.5 g 1,4-butanediol diacrylate, 80.0 g pentaerythritol tetraacrylate, 80.5 g ethoxylated (4) pentaerythritol tetraacrylate, all from Sartomer Company, Exton, Pa. and 18 g acrylic acid from Sigma-Aldrich Company, Milwaukee, Wis. To the mixture was added a further 97.5 g pentaerythritol tetraacrylate (Sartomer), 12 g cellulose acetate butyrate from (Sigma-Aldrich) and 108 g n-butyl acetate. An ultraviolet radiation curable composition was prepared via the following procedure. 166 g n-butyl acetate and 5.1 g diphenyl (2,4,6-trimethylbenzoyl)phosphine oxide/2-hydroxy-2-methylpropiophenone 50/50 blend (Sigma-Aldrich) were added to 500 g of the dispersion of titanium dioxide in acrylic monomers. The mixture was filtered using a 5 micron nylon filter bag. 500 g of the ultraviolet radiation curable composition was applied via a slot-die coater from Frontier Technologies, Towanda, Pa. to a polyethylene terephthalate substrate and dried at 150° F. for 12 seconds and then ultraviolet radiation cured using a 100 W mercury lamp. The hardened film was then removed from the polyethylene terephthalate substrate.

The hardened film was processed into a fine powder by dry milling for 10 minutes with a mortar and pestle. 38.41 g of the milled powder (50% pigment on total solids) was added to 84.57 g of DCU2042 and 18.54 g of DT870 (a clearcoat package and a solvent reducer package available from PPG Industries, Inc. as one component of a two component binder system. The milled powder was dispersed within the binder by shaking on a Red Devil shaker for 20 minutes. After completing the dispersing phase, 24.01 g of the second component, DCX61, (a crosslinking package available from PPG Industries, Inc.) was added, and the composition was re-shaken for 5 minutes.

EXAMPLE 15

Example 14 was repeated except that 0.47 g of stearyl acetate was added with the acrylic acid.

EXAMPLE 16

Comparative

A comparative coating composition to Examples 14 and 15 was prepared by adding 38.89 g of a preprocessed dispersion of rutile titanium dioxide, D700, (a white mixing base available from PPG Industries, Inc.) to one component of the same two component binder system used in Example 14, and then shaken on a Red Devil shaker for 20 minutes. After being shaken, the second component was added, and the composition was re-shaken for 5 minutes.

EXAMPLE 17

19.20 g of a 5% pigment solids dispersion of the colorant of Example 2 was added to the coating composition of Example 14. The tinted coating composition was shaken on a Red Devil shaker for 5 minutes, equilibrated for 5 minutes, and drawn down over Form 1B Leneta paper (Penopac available from The Leneta Company, Ho-Ho-Kus, N.J.) with a 48 gauge, wire drawdown rod (wire-wound rods available from Paul N. Gardner Co. Inc., Pompano Beach, Fla.). This drawdown was cured under ambient conditions for 24 hrs. After curing, the color and opacity of the drawdown were measured with a Minolta CM-3600d spectrophotometer. The color and opacity data are shown in Table 9.

EXAMPLE 18

Example 17 was repeated using the coating composition of Example 15.

EXAMPLE 19

Comparative

Example 17 was repeated using the comparative coating composition of Example 16.

Table 9 shows that at about the same opacity, Example 17 and more especially, Example 18 show the advantage of being more red (larger a*) than the comparative Example 19. Therefore, equal hiding with less color dilution from white pigment was found with Example 17, and especially with Example 18, than with Example 19.

TABLE 9

| Drawdown | L* | a* | b* | C* | h° | % opacity |
|---|---|---|---|---|---|---|
| Example 17 | 57.05 | 43.74 | −20.41 | 48.27 | 334.98 | 93.74 |
| Example 18 | 52.06 | 48.04 | −19.42 | 51.81 | 337.99 | 92.13 |
| Example 19 | 58.32 | 42.12 | −19.87 | 46.57 | 334.74 | 92.53 |

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A powder coating comprising:
   a resinous binder; and
   a plurality of colorants, wherein a majority of the colorants have a maximum haze of about 10% and exhibit an absorbance peak in the visible spectrum.

2. The powder coating of claim 1 wherein at least about 50% of the total absorbance in the visible spectrum occurs at wavelengths within about 50 nm of the wavelength of the peak absorbance.

3. The powder coating of claim 1 wherein each of the colorants: (i) has a maximum haze of about 10%; and (ii) exhibits an absorbance peak in the visible spectrum wherein at least about 60% of the total absorbance in the visible spectrum occurs at wavelengths within about 50 nm of the wavelength of the peak absorbance.

4. The powder coating of claim 1 comprising 2 to 10 of said colorants.

5. The powder coating of claim 4 further comprising a white colorant or a black colorant or both.

6. The powder coating of claim 4 wherein a first colorant has an absorbance peak between about 400 to about 500 nm, a second colorant has an absorbance peak between about 500 to about 600 nm, and a third colorant has an absorbance peak between about 600 to about 700 nm.

7. The powder coating of claim 1 wherein the powder coating composition produces a transparent coating.

8. The powder coating of claim 1 further comprising a plurality of substrate-hiding particles.

9. The powder coating of claim 8 wherein said substrate-hiding particles are in the form of platelets.

10. The powder coating of claim 9 wherein said substrate-hiding particles comprise graphite, aluminum, mica or a scattering member.

11. The powder coating of claim 10 wherein said scattering member is encapsulated in a polymer.

12. The powder coating of claim 1 wherein said colorants are pigments or dyes.

13. The powder coating of claim 12 wherein said colorants comprise organic pigments having a particle size of less than about 150 nm.

14. The powder coating of claim 13 wherein said pigments are produced by milling organic pigments with milling media having a particle size less than about 0.3 mm.

15. The powder coating of claim 13 wherein said pigments are produced by milling organic pigments with milling media having a particle size less than about 0.1 mm.

16. A powder coating comprising a plurality of flake-like assemblages for hiding a substrate, said assemblages comprising a plurality of scattering members encapsulated in a resinous polymer, wherein a difference in refractive index between said scattering members and said polymer is greater than about 0.1 and said assemblage has an aspect ratio of about 2 to about 250.

* * * * *